Aug. 9, 1938.  C. W. KALKHOFF  2,126,018
METHOD OF AND APPARATUS FOR FILTERING DISTILLERY SLOP
Filed March 31, 1936
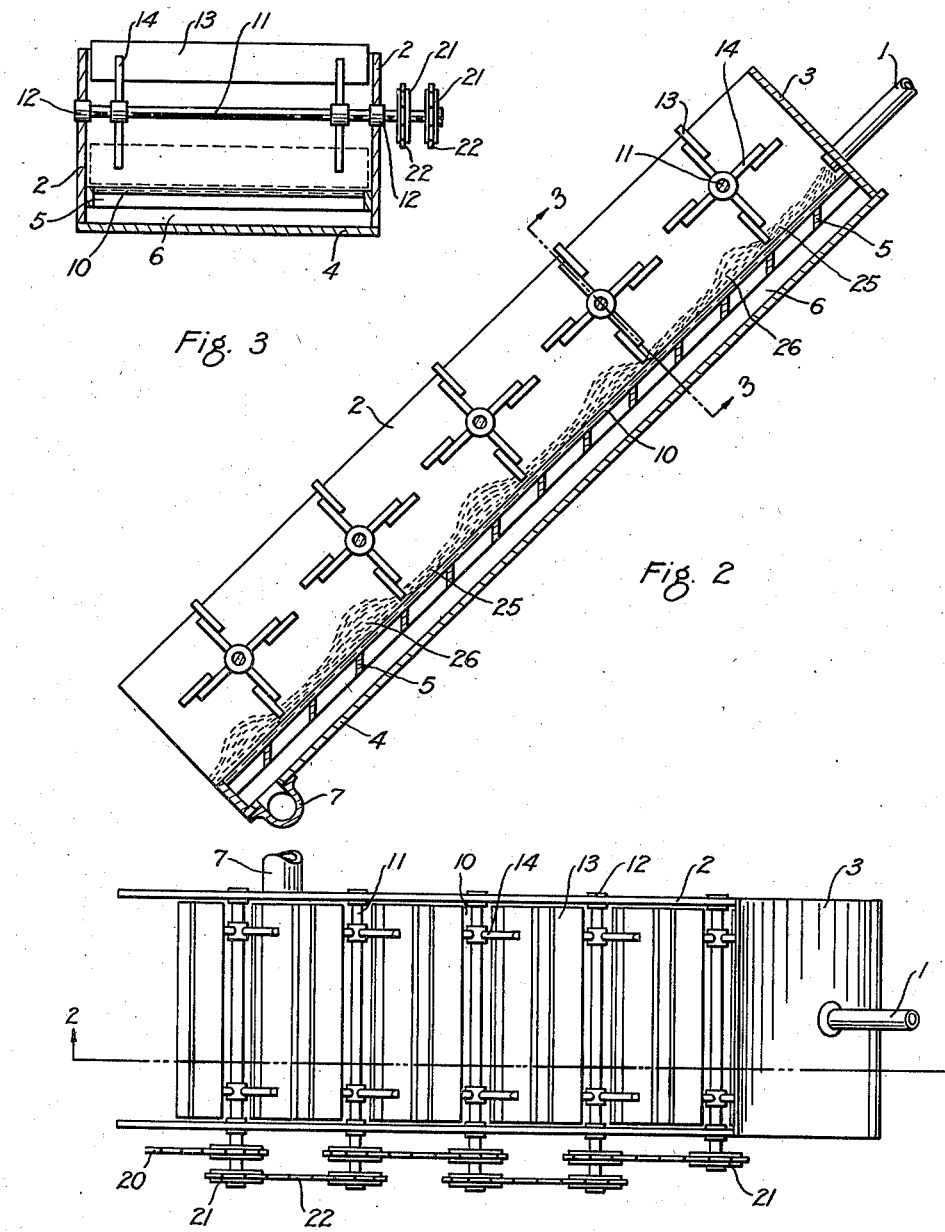
Inventor
Charles W. Kalkhoff
By  W E Sherwood
Attorney Patented Aug. 9, 1938

2,126,018

UNITED STATES PATENT OFFICE 2,126,018

METHOD OF AND APPARATUS FOR FILTERING DISTILLERY SLOP

Charles W. Kalkhoff, Louisville, Ky., assignor, by direct and mesne assignments, to Louisville Drying Machinery Company, Incorporated, Louisville, Ky., a corporation of Kentucky Application March 31, 1936, Serial No. 71,857

6 Claims. (Cl. 210—151)

This invention relates to the art of separating liquid from wet material and is particularly well adapted to the treatment of distillery slop. As the description proceeds, however, it will become apparent that the invention is in no way limited to this particular usage, but on the contrary may be used in the treatment of various other substances with equally satisfactory results.

The reclamation of the valuable grain elements from distillery slop has long been practiced and many inventions directed toward the filtering, pressing and drying phases of this art have been developed. In the preliminary step incident to reclaiming these grain elements various means intended to cause the separation of the liquid from the wet grain in the slop have been employed, but so far as is known each of those now in use has certain inherent disadvantages. The usual method has consisted in moving the slop coming from the still over the surface of an inclined screen and permitting the wet grain to form a relatively solid cake which moves under the influence of gravity into a hopper leading to a press. Since this method alone would permit channelling of the liquid through the wet cake of solids and since the material tends to slide more slowly along the screen as it loses the liquid held therein, various expedients have been developed to overcome these disadvantages. The usual expedient has been to provide a conveyor travelling along the surface of the screen and moving the wet grain into the hopper at a fixed rate of travel. Use of such a conveyor has resulted in numerous disadvantages such as wear upon the screen, frequent reservicing and adjustment of the conveyor apparatus and insufficient draining of the liquid from the cake of wet grain.

Furthermore, the formation of a heavy wet cake of grain sliding along a screen with only the lower surface of the cake in contact with such screen tends to obstruct the draining off of liquid held by the grain resting above the saturated lower surface of the cake and results in an unequal draining effect. As a result of such a non-uniform filtering and draining a greater load is placed upon the pressing and drying apparatus than that found to be present when the damp material has been agitated and subjected to a uniform filtering or draining effect.

This invention, therefore, has as an object the teaching of a method of filtering wet material which provides an agitation of such material to insure a uniform draining off of the liquid held by the entire mass of material and an increased evaporation of moisture from the surface of the material;

A second object is the teaching of an improved method of filtering material uniformly preparatory to drying the same whereby the drying load may be lessened as a result of the uniform filtering of the wet material;

Another object is the provision of filtering apparatus which prevents the channelling of liquid through the cake of wet material;

Another object is the provision of filtering apparatus which insures a regulated rate of travel of the wet material;

Another object is the provision of filtering apparatus which is simple in construction, reliable in operation and requires a minimum of attention;

Other objects and advantages of the invention will become apparent as the description proceeds when considered in connection with the accompanying drawing in which;

Figure 1 is a plan view of the apparatus as installed;

Figure 2 is a partial sectional view taken on line 2—2 of Figure 1, and

Figure 3 is a partial sectional view taken on line 3—3 of Figure 2.

As shown in the drawing a pipe system 1 of any suitable arrangement leads the wet material, which for convenience will be described as distillery slop, to an elevated portion of an inclined chute and deposits the same on the surface of a screen 10. The chute comprises upstanding sides 2, a head plate 3 and a bottom member 4. Extending transversely of the chute above the bottom member is a series of stringers 5 which provide a secure support for screen 10 and are made of narrow dimensions so as to impose a minimum of obstruction to the liquid draining through the screen.

Liquid draining through screen 10 passes into the space 6 above the bottom member and flows into an outlet pipe 7 which leads the liquid to any suitable storage point where it may be subjected to further treatment if desired. In order to provide for a regulated movement of the soggy grain along the inclined screen and to insure a uniform and thorough draining of such grain an agitating means is provided, the function of which will become more apparent as the description proceeds.

One form which the agitating means may assume is depicted in the drawing and comprises a shaft 11 disposed above screen 10 and journalled in bearings 12 in the sides 2 of the chute. Any suitable number of such shafts may be provided depending upon the material being filtered, the size of the apparatus employed and similar factors. Securely attached to shafts 11 are a plurality of vanes 13 secured to the shafts by any suitable means such as arms 14. As shafts 11 are rotated in their bearings these vanes turn into close proximity to the surface of screen 10 and agitate the wet material sliding along such screen. Since the path of travel of the vanes is in close proximity to the screen, the screen is substantially cleared of all material at this point as the vane passes close to its surface. This cleared space is then immediately filled up with other material sliding gravitationally into the open space, which movement brings a new surface of material into contact with the screen and results in a thorough filtering of the new mass of material.

Any convenient source of power (not shown) such as an electric motor or the like may be used to drive a chain 20 to actuate the agitating means. As shown, the shafts 11 are provided on one end with one or more sprocket wheels 21 driven in unison by a series of connecting chains 22. In the apparatus shown in Figure 2 shafts 11 rotate clockwise for a purpose explained hereinafter more in detail. It will be obvious that the dimensions of such wheels 21, the speed of driving chain 20 and the relative positions of vanes 13 on shafts 11 may be widely varied without departing from the scope of the invention. Moreover, the actual configuration of the individual vanes 13 may be varied, as by making them convex or concave, depending upon the particular installation of the apparatus. Many variations in application of the invention, such as having the shafts 11 rotate at different speeds, having the shafts 11 and their attached vanes angularly displaced relative to each other and having driving means at each end of shafts 11 will also suggest themselves to the person skilled in the art without departing from the scope of the invention.

In operating the apparatus above described the following method of filtering the material results. The distillery slop entering from pipe 1 comprises a saturated mass of wet grain of varying sizes contained in a large amount of liquid. For purposes of description such liquid is herein referred to as "free liquid" with the intention of defining the same as liquid which is not chemically or tenaciously bound into the material. Immediately upon being deposited on screen 10 this grain and liquid spreads out into a mass 25 of substantially uniform thickness and begins to slide under the influence of gravity down the surface of the screen. The liquid at once begins to drain through the small holes in the screen, but since there is a large amount of liquid it will tend to move in the path of least resistance and will begin to form a channel through the mass of grain ahead of it. This channelling if unrestrained will reduce the filtering effect and tend to sweep grain particles along with the liquid.

When the grain and liquid mass 25 reaches the path of travel of the vanes 13 on the upper shaft 11 such vanes then interpose a movable barrier to the liquid and check the channelling of the same. As a vane 13, such as shown in Figure 2, turns into the path of the mass of wet material it first acts to push the material further along the screen. As vane 13 continues its rotation the material in its path is then lifted and formed into a temporary ridge or wave 26 as shown in dotted lines in Figure 2. This pushing and lifting of the wet material then exposes a new surface of the material to the screen as such material again settles into a wet cake of substantially uniform thickness. In addition, the movement of a vane 13 into close proximity to the surface of screen 10 leaves a temporarily bare surface of the screen behind the vane as it clears the screen of the saturated layer of material. Any free liquid therefore quickly drains through this exposed screen surface into space 6 and is thus removed from further contact with the material.

In this way the material is moved along the screen under the influence of gravity and the rotatable agitating means and constantly has a changing surface exposed to the screen. The alternate forming of a cake of uniform thickness and a ridge of varying thickness which settles back into a cake as before enables a uniform draining of liquid from the soggy grain to take place. Moreover, the vanes 13 in agitating the wet grain throw a screen of the same into the air and increase the evaporation of moisture from such grain.

Since the actuating means 20 may be controlled by any conventional regulating mechanism, the vanes 13 may be turned at a slower, faster or equal rate with the movement of the wet material sliding under the influence of gravity. In general, such material tends to slide more slowly as the liquid is drained away and by regulating the speed of shafts 11 a uniform movement of the material can be assured regardless of its tendency to move gravitationally. It will be apparent that the location of movable vanes 13 is such that the time of travel of the material along the screen will necessarily become dependent upon the speed of rotation of those vanes.

Consequently, if it is desired to hold the material in contact with the screen longer than would normally happen when the material moved only by the force of gravity, the speed of rotation of vanes 13 can be decreased and thus cause the material to move more slowly. Conversely, if it is desirable to move the material faster than it would travel under the influence of gravity, the speed of rotation of vanes 13 may be increased. As the material passes from the lower end of the screen it may be led into the hopper of a press or into a drier by any suitable means (not shown) such as a conveyor or the like.

Having thus described the invention it is obvious that various modifications of the same can be made without departing from the scope thereof.

I claim:

1. The method of filtering wet material uniformly comprising, directing the material downwardly along an inclined screen, varying the thickness of the mass of material and preventing the maintenance of a soggy lower layer of material by agitating the material during such movement to provide a continual change in the surface of the material in contact with the screen, and regulating the time of travel of the material along the screen in dependence upon the agitating step.

2. Apparatus for filtering wet material including an inclined screen, means depositing wet material at an elevated point on said screen, means collecting liquid passing through the screen, rotatable stirring means breaking up the wet cakes of material in contact with the screen and permitting of a thorough filtering action, said stirring means comprising a plurality of rotatable vanes extending into the path of the wet material near the surface of the screen and adapted to push the wet material along the screen and to change the material in contact with the screen.

3. Apparatus for filtering wet material including an inclined screen, means depositing wet material at an elevated point on said screen, means collecting liquid passing through the screen, a plurality of shafts positioned above the screen and driven by a source of regulated power, spaced vanes attached to said shafts and having a path of travel extending into the path of travel of the wet material near the surface of the screen whereby the vanes attached to an upper shaft may push the wet material in its path down the screen into the path of travel of the vanes on a lower shaft and may stir up such wet material in order to bring a new surface of the same into contact with the screen.

4. Apparatus for filtering wet material including a chute having an inclined screen, means depositing wet material at an elevated point on said screen, means collecting liquid passing through the screen, a plurality of transverse shafts positioned above the screen and journalled in the sides of the chute, spaced vanes attached to the shafts and adapted to turn into the path of travel of the wet material sliding along the screen, and driving means connecting the shafts to a source of regulated power whereby the vanes may regulate the speed at which the wet material slides along the screen.

5. Apparatus of the character described comprising, an inclined screen having an inclination greater than the angle of rest of material, means depositing wet material at an elevated point on said screen for gravitational movement along the screen, a rotatable member extending into close proximity to the surface of the screen and agitating the material in direct contact with the screen whereby the material moving along the screen may be removed from direct contact with the screen by said rotatable member and new material may move gravitationally into direct contact with the screen.

6. The method of uniformly filtering wet material containing free liquid comprising, directing the material downward along an inclined filtering surface, varying the thickness of the mass of material and preventing the maintenance of a soggy lower layer of material by agitating the material in its downward movement and breaking the saturated layer in contact with the filtering surface to permit free liquid to drain through the filtering surface, and then bringing a new body of the material into contact with the filtering surface by means of the agitation in order to provide a uniform effect for the material.

CHARLES W. KALKHOFF.